United States Patent
Naum

(10) Patent No.: US 7,780,871 B2
(45) Date of Patent: Aug. 24, 2010

(54) INORGANIC LIGHT-EMITTING MATERIALS FOR UV SOLID LIGHT SOURCE

(75) Inventor: Soshchin Naum, Taipei (TW)

(73) Assignee: Wei-Hung Lo, Taipei (TW)

( * ) Notice: Subject to any disclaimer, the term of this patent is extended or adjusted under 35 U.S.C. 154(b) by 257 days.

(21) Appl. No.: 11/410,921

(22) Filed: Apr. 26, 2006

(65) Prior Publication Data
US 2007/0252109 A1 Nov. 1, 2007

(51) Int. Cl.
*C09K 11/79* (2006.01)

(52) U.S. Cl. .................................. 252/301.4 F

(58) Field of Classification Search ............ 252/301.4 F
See application file for complete search history.

(56) References Cited

U.S. PATENT DOCUMENTS

| | | | |
|---|---|---|---|
| 6,522,065 | B1 | 2/2003 | Srivastava et al. |
| 6,765,237 | B1 | 7/2004 | Doxsee et al. |
| 6,853,131 | B2 | 2/2005 | Srivastava et al. |
| 2005/0093442 | A1 * | 5/2005 | Setlur et al. ................. 313/512 |

\* cited by examiner

*Primary Examiner*—C. Melissa Koslow
(74) *Attorney, Agent, or Firm*—Rosenberg, Klein & Lee

(57) ABSTRACT

A type of inorganic light-emitting material for a UV solid light source is described. The inorganic light-emitting material is fluorescent powder for a silicate-based UV solid light source. The main ingredient is $Sr_2CaLn_2(SiO_4)_{3\pm\delta}$. The center of the light-emitting part is the material entering the cation light lattice node. The material is $Eu^{+2}$, $Sm^{+2}$, $Yb^{+2}$, $Mn^{+2}$, $Sn^{+2}$, and $Cu^{+2}$ series +2 valence ions. The second part of the light-emitting is the +3 valence $TR^{+3}$ ions of $Ce^{+3}$, $Eu^{+3}$, $Tb^{+3}$, $Sm^{+3}$, and $Dy^{+3}$ series distributed inside the nodes. When the chemical index is $0 \leq \delta \leq 0.2$, the indium nitride and gallium nitride-based allomorphous semiconductor short wave UV light, under conditions of excitement, produces light radiation wavelength $\lambda \leq 430$ nm multiple band white light that can then be used. The color temperature is between T=2500K and 12000K.

8 Claims, No Drawings

INORGANIC LIGHT-EMITTING MATERIALS FOR UV SOLID LIGHT SOURCE

BACKGROUND OF THE INVENTION

1. Field of the Invention

This invention relates to an inorganic powder that uses a UV solid light source, in which the chemical formula of the main component is $Sr_2CaLn_2(SiO_4)_{3\pm\delta}$. When using indium gallium nitride and gallium nitride-based semiconductor allomorphous short wave UV light under excited status, multiple band white light can be obtained.

2. Description of Related Art

In recent years, the manufacturing technology of the solid light source has continuously improved. The illumination efficiency has been increased greatly. Since a solid light source emits a nearly monochrome light wave, and it is advantageously reliable, long-lived, and broadly applicable, it is used in many lighting equipment applications. There is a trend of replacing traditional vacuum light bulbs with solid light sources.

The development of a white light source is a mixture light of multiple colors. The white light observed by human eyes contains a mixture of lights with at least two or more wavelengths. When human eyes are simultaneously excited by red, blue, and green light, or simultaneously excited by light of complementary colors, such as blue and yellow, the light is perceived as white light. This principle can be used to generate a solid light source for white light.

There are main four conventional means of white light solid light source generation:

The first method uses three solid light sources with InGaAlP, GaN, and GaN as materials. It is energized under respective controls, through the solid light sources, to emit red, green, and blue light. Then, a lens is used to mix the emitted light and generate white light.

The second method uses two solid light sources with GaN and GaP as materials. The solid light sources, which are also individually controlled to emit blue and yellow green lights, are energized to generate white light. Although the efficiency of illumination for the above mentioned two methods may reach 20 lm/W, if one of the different color sources' solid light source fails, normal white light cannot be obtained. Further, the positive pressures are different. Thus, there are requirement for many sets of control electric circuits. The cost is high. These are the many disadvantages of practical applications.

The third method was developed in 1996 by Nichia Chemical of Japan. An indium gallium nitride blue solid light source and yellow light-emitting yttrium aluminum garnet fluorescence material are used to form a white light source. Although, at the present time, the efficiency of illumination (as much as 15 lm/W) is lower than that of the previous two methods, only one solid light source chip set is required. The manufacturing cost has been reduced significantly. Furthermore, the formulation and production technology for the fluorescence material is mature, and there are commercial products available.

However, the second and third conventional methods utilize color compensation principle to generate white light. The continuity of spectrum wavelength distribution is not as good as sunlight. After mixture of the color lights, in the visible light spectrum range (400 nm-700 nm), the color is not even. The saturation of color is low. This phenomenon can be ignored by human eyes, and they only perceive white color light. However, a high precision optical detector, such as a video camera or camera, detects the color rendering as low. That is, errors will be caused during reduction. Thus, the white light sources generated by these methods can only be used for simple lighting applications.

The fourth conventional white light generating method was developed by Sumitomo Electric Industries, Ltd of Japan. It uses ZnSe material for the white solid light source. A CdZnSe thin film is first formed on a ZnSe single crystal baseboard. After energizing, the thin film emits blue light. At the same time, a portion of the blue light shines on the baseboard and emits yellow light. Finally, the blue and yellow lights compensate for each other and generate white light. This method utilizes only a solid light source crystal. The operation voltage is only 2.7V, lower than the 3.5V required for a GaN solid light source. Additionally, this method of white light generation does not require fluorescent material. However, the disadvantages are that the efficiency of illumination is only 8 lm/W, and the service life is only 8000 hours.

In addition to the aforesaid white light generation methods by a solid light source, attempts are currently being made to excite, in a controlled manner, $Y_3Al_5O_{12}$:Ce fluorescence material. The additives used to replace Al are Ga or Sc. Alternatively, Lu, Tb, and Sm are used to replace Y, but with limited results. However, these fluorescence material radiation light spectrum are normally located in the green-yellow zone of the visible light. That cannot integrate the design of solid light source and the soft white light generated by a white light lamp with an equivalent color temperature of 2800K-3500K In the current art method announced J. K. Park, the white solid light source uses Ga—N as base, and its cold light properties. ("White Light-emitting Diodes of Ga—N-Based $Sr_2SiO_4$:Eu and the Luminescent Properties" J. Electrochem. Solid State Lett., vol 5 {2002} p. H11). The chemical composition used is silicate inorganic powder based on strontium compounds with the chemical formula as $Sr_{2-x}Eu^{+2}_xSiO_4$. The principle of illumination of inorganic powders is related to the transfer radiation of $Eu^{+2}$ replacement of $Sr^{+2}$ ions at the crystal sieve anode nodes. The limited utilization of n-silicate inorganic powder production of standard blue light In—Ga—N allomorphous in white solid light source is that the short wave wavelength used for self excitement is around $\lambda \leq 420$ n, where, for example, $\lambda=395$ nm, $\lambda=405$ nm, and $\lambda=380$ nm are used.

After the aforesaid n-silicate inorganic powder $Sr_{2-x}Eu^{+2}SiO_4$ is excited by the UV light, the radiation light spectrum is yellow green, and cold color-adjusted white light can be obtained. Compared to the production equipment of present art using yttrium aluminum garnet fluorescence material, it has a much higher Rendering index. It offers the main advantages of the n-silicate inorganic powder solid light source. However, obtaining these advantages can only be achieved when double portions of inorganic powder mixing agents are used in the solid light source.

In addition to the above-mentioned disadvantage that double portions of inorganic powder mixing agents must be used, the strontium europium-based n-silicate material is very inefficient. When the angles used for the produced white light are between 30° and 120°, the light intensity is J=0.1-0.3 candlelight. At the same time, the heat resistance of this diode should not exceed 80-90° C. That is, when a solid light source is heated to these values, the light brightness is reduced by half. In addition, the temperatures used in the generation process of the inorganic powder is T=1100-1200° C. This is not sufficient to combine the quantum effect of the inorganic powders. During the synthesizing of various known silicate inorganic powder, the vitrification of products easily occurs.

This forces the grinding of the vitrified inorganic powder and leads to a lower quantum effect.

For the present art that uses UV chips as solid light source, such as U.S. Pat. No. 6,765,237 "White light-emitting device based on UV solid light source and phosphor blend", a fluorescent body is provided. The fluorescent body is the combination of two chemical components, to achieve excitation of the white solid light source by UV light. Then, there are the U.S. Pat. Nos. 6,853,131 and 6,522,065 that present a UV solid light source fluorescence body that generates white light. The main component is the $A_{2-2x}Na_{1+x}E_xD_2V_3O_{12}$.

SUMMARY OF THE INVENTION

This invention relates to the use of a UV solid light source. Externally packaged inorganic light-emitting material is excited to emit white light. The chemical formula for silicate based inorganic light-emitting material is $Sr_2CaLn_2(SiO_4)_{3\pm\delta}$, where Ln represents Lu, Y, Gd, Sc, Yb, and Tb series oxidation +3 valence rare earth cations. The light-emitting center of Ln consists of $Eu^{+2}$, $Sm^{+2}$, $Yb^{+2}$, $Mn^{+2}$, $Sn^{+2}$, and $Cu^{+2}$ series +2 valence ions entering the cation light lattice nodes. The nodes are composed of 2 valence $Sr^{+2}$ and $Ca^{+2}$ ions. At this time, the second part consists of $Ce^{+3}$, $Eu^{+3}$, $Tb^{+3}$, $Sm^{+3}$, and $Dy^{+3}$ series +3 valence $TR^{+3}$ ion distributed within the nodes. These nodes are configured by this and the addition of rare earth cations. When the chemical index is $0 \leq \delta \leq 0.2$, multiple zones under a light radiation wavelength of $\lambda \leq 430$ nm can be formed. The color temperature is between T=2500K and 12000K.

The chemical formula of inorganic light-emitting material's better preferred embodiment is $Sr_{2-x}Eu_x^{+2}Ca_{1-y}Mn^{+2}{}_yLa_{2-z}Ce_z^{+3}(SiO_4)_{3+0.1}$. In this preferred embodiment, when excited by short wave purple light, white-green-yellow light in the light spectrum range is emitted.

Another preferred embodiment of this invention is a chemical formula of the inorganic light-emitting material of $Sr_{2-x}Sm^{+2}{}_xCaLa_{1-z}GdCe_z^{+3}(SiO_4)_{3-0.1}$. When excited by short wave purple light, green-yellow light in the light spectrum range is emitted.

In a preferred embodiment of this invention, the chemical formula of the inorganic light-emitting material is $Sr_{2-x}Eu^{+2}{}_xCaLa_{1-z}Ce^{+3}{}_zY_{1-p}Tb^{+3}{}_p(SiO_4)_{3+0.1}$. When excited by short wave purple light of wavelength $\lambda \leq 430$ nm, multiple zone white-green-yellow light is emitted.

In another preferred embodiment of this invention, the chemical formula of the inorganic light-emitting material is $Sr_{2-x}Eu^{+2}{}_xCa_{1-y}Sn_y^{+2}Y_{1-z}GdCe^{+3}{}_z(SiO_4)_{3\pm0.1}$. When excited by short wave purple light of wavelength $\lambda \leq 430$ nm, multiple zone blue-red-yellow light is emitted.

In another preferred embodiment of this invention, the chemical formula of the inorganic light-emitting material is $Sr_{2-x}Eu^{+2}{}_xCa_{1-y}Mn_y^{+2}Gd_{2-z}Ce^{+3}{}_z(SiO_4)_{3\pm0.1}$. When excited by short wave purple light of wave length $\lambda \leq 430$ nm, multiple zone blue-green-orange wave segments are emitted.

The characteristics of this invention's UV solid light source's inorganic light-emitting material are the corresponding sub-lattices between cations and cathode ions, two emitting centers, the chemical formula is $Sr_{2-x}Eu^{+2}{}_xCa_{1-y}Mn^{+2}{}_yY_{1-z}Ce_zGd_{1-p}Pr_p(SiO_4)_3$, and emission of blue, green yellow and orange light in the visible light zone and consisting of multiple emission zones.

The UV solid light source's inorganic light-emitting material includes multiple distributed diamond shaped particles and branched crystal particles. The reflective coefficient ratios between light-emitting materials and polymer adhesion resins are 1.65:1.45 to 1.80:1.55. The contents of the light-emitting material particles are 10-75%. The formed layer has a thickness of about 20-200 micrometers.

The production method for the aforesaid inorganic fluorescent powder is a heat treatment of the oxidants. The characteristics are that the process is completed in two stages to produce the inorganic light-emitting materials. The UV solid light source equipment of this invention comprises an allomorphous semiconductor, and through a combination of wire, crystal, and an optical lens on the allomorphous semiconductor. The polymer coating of the surface of the allomorphous solid light source contains a fixed amount of inorganic light-emitting material. The initial radiation of the UV solid light source is converted to white light radiation. The color temperature is between T=2500K and 12000K.

BRIEF DESCRIPTION OF THE DRAWINGS

No drawings are included with the description of the preferred embodiments.

DETAILED DESCRIPTION OF PREFERRED EMBODIMENTS

The invention utilizes a UV light-excited white solid light source, including a novel UV solid light source inorganic powder combination based on an inorganic powder of the n-silicate II group elements to improve the defects found in the present art. The invention also proposes an inorganic light-emitting material, the light-emitting center including valence 2 ions, such as $Eu^{+2}$, $Sm^{+2}$, $Yb^{+2}$, $Mn^{+2}$, $Sn^{+2}$, and $Cu^{+2}$ series. The second part of the light-emitting center is valence 3 ions $Ce^{+3}$, $Eu^{+3}$, $Tb^{+3}$, $Sm^{+3}$, and $Dy^{+3}$ series. A stable and standard equipment for repeated use in the inorganic powder synthesis process is developed. A novel inorganic powder for a short wave solid light source is produced, in which materials are excited by the UV light, violet and blue light zones of the visible light, and the light spectrum is expanded.

This invention uses a UV solid light source and external covered inorganic light-emitting material is thereby excited to emit white light. The chemical formula for the silicate based inorganic light-emitting material is $Sr_2CaLn_2(SiO_4)_{3\pm\delta}$ Where Ln is the +3 valence rare earth cations of Lu, Y, Gd, Sc, Yb, and Tb. The light-emitting center of Ln is composed of the $Eu^{+2}$, $Sm^{+2}$, $Yb^{+2}$, $Mn^{+2}$, $Sn^{+2}$, and $Cu^{+2}$ series +2 valence ions that entered the cation light lattice node. The nodes are configured by +2 valence $Sr^{+2}$ and $Ca^{+2}$ ion. At this time, the second part of the light-emitting center is composed of the $Ce^{+3}$, $Eu^{+3}$, $Tb^{+3}$, $Sm^{+3}$, and $Dy^{+3}$ series 3 valence $TR^{+3}$ ions distributed in the nodes. The nodes are structured by adding rare earth cation thereto. When the chemical index is at $0 \leq \delta \leq 0.2$, multiple zone radiation under light radiation wavelength $\lambda \leq 430$ nm is formed. The color temperature is between T=2500K and 12000K.

Other preferred embodiments include $Sr_{2-x}Eu_x^{+2}Ca_{1-y}Mn^{+2}{}_yLa_{2-z}Ce_z^{+3}(SiO_4)_{3+\delta}$, where $0 \leq \delta \leq 0.2$, x=0.001-0.2, y=0.001-0.04, z=0.001-0.2, and when excited, a light in a white-green-yellow spectrum range is emitted; $Sr_{2-x}Sm^{+2}{}_xCa_1La_{1-z}Gd_1Ce^{+3}{}_z(SiO_4)_{3-\delta}$, where $0 \leq \delta \leq 0.2$, x=0.001-0.2, y=0.001-0.2, z=0.001-0.2, and when excited, a light in a green-yellow spectrum range is emitted; $Sr_{2-x}Eu^{+2}{}_xCa_1La_{1-z}Ce^{+3}{}_zY_{1-p}Tb^{+3}{}_p(SiO_4)_{3+\delta}$, where $0 \leq \delta \leq 0.2$, x=0.001-0.2, p=0.01-0.2, z=0.001-0.2, and when excited by light with wavelength $\lambda \leq 430$ nm, multiple zone white-green-yellow light is emitted; $Sr_{2-x}Eu^{+2}{}_xCa_{1-y}Sn_y^{+2}Y_{1-z}Gd_1Ce^{+3}{}_z(SiO_4)_{3\pm\delta}$, where $0 \leq \delta \leq 0.2$, x=0.001-0.2, y=0.005-0.2, z=0.001-0.2, and when excited by light with wavelength $\lambda \leq 430$ nm, multiple zone blue-red-yellow light is emitted; $Sr_{2-x}Eu_x^{+2}Ca_{1-y}Mn_y^{+2}Gd_{2-z}Ce^{+3}_z(SiO_4)_{3+\delta}$, where $0 \leq \delta \leq 0.2$, x=0.001-0.2, y=0.01-0.1, z=0.01-0.2, and when excited by light with wavelength $\lambda \leq 430$ nm, multiple zone blue-green-orange light is emitted; and $Sr_{2-x}Eu_x^{+2}Ca_{1-y}Mn_y^{+2}Y_{1-z}Ce_zGd_{1-p}Pr_p(SiO_4)_3$, where x=0.001-0.2, y=0.001-0.04, z=0.001-0.2, p=0.001-0.02, and the visible light zone emits blue, green, yellow, and orange lights, and composed of multiple zone radiation.

From the above, the following preferred embodiments are proposed.

The short wave UV and blue solid light sources can use an n-silicate inorganic light-emitting material. The composition of the chemical formula of the inorganic light-emitting material is described in the following chemical formula:

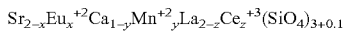

where x=0.001-0.2 y=0.001-0.04 z=0.001-0.2

In this preferred embodiment, the excited short wave purple light emits white-green-yellow light in the light spectrum range.

In another preferred embodiment of this invention, the chemical formula of inorganic light-emitting material is:

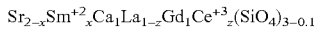

where x=0.001-0.2 y=0.001-0.2 z=0.001-0.2

When excited by short wave purple light, green-yellow light is emitted.

In one preferred embodiment of this invention, the chemical formula for inorganic light-emitting material is:

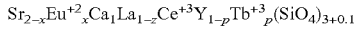

where x=0.001-0.2 p=0.01-0.2 z=0.001-0.2

When excited by short wave purple light of wavelength $\lambda \leq 430$ nm, multiple zone radiation of white-green-yellow light is emitted. The residue light continues for $\tau \leq 1.5$ ms.

In another preferred embodiment of this invention, the chemical formula of this inorganic light-emitting material is:

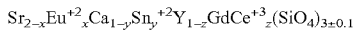

where x=0.001-0.2 y=0.005-0.2 z=0.001-0.2 when excited by short wave purple light of wave length $\lambda \leq 430$ nm, multiple zone radiation of blue-red-yellow light is emitted.

In another preferred embodiment of this invention, the chemical formula of inorganic light-emitting material is:

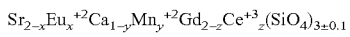

where x=0.00140.2 y=0.01-0.1 z=0.01-0.2

When excited by short wave purple light radiation wavelength $\lambda$=450 nm, multiple zone radiation of blue-green-orange light is emitted. The color index combines with the first radiation part $R_a$>85.

The characteristics of this inorganic light-emitting material are the corresponding sub-lattices between cation and cathode ions, and two emitting centers. The chemical formula is:

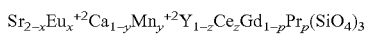

where x=0.001-0.2 y=0.001-0.04 z=0.001-0.2 p=0.001-0.02

In the visible light zone, blue, green and orange light is emitted, to form multiple zone radiation.

As shown in the above preferred embodiments, this invention presents an inorganic light-emitting material for a UV solid light source. Most of the light-emitting materials include multiple distributed diamond shaped particles and branched crystal particles. The reflective coefficient ratios between the inorganic light-emitting material and polymer adhesion resins are 1.65:1.45 to 1.80:1.55. The particle contents are 10-75%, sufficient to form an even layer with a thickness of about 20-200 micrometers.

The production method for the UV solid light source's inorganic light-emitting material is a heat treatment of oxidants. Two stages are used to obtain the light-emitting materials:

(1) In the first stage of the heat treatment process, under reducing conditions, the valence 2 and valence 3 catalysts are individually catalyzed by the oxidation components;

(2) In the second stage, the compounds obtained are mixed with 2-silicone oxide in a 3:1-3 ratio and at a temperature of T=110-1600° C. The heat treatment is carried out in neutral or weakly reducing condition. The time required is 1-24 continuous hours.

The UV solid light source equipment of this invention comprises an allomorphous semiconductor and a combination of wire, crystal and an optical lens on the semiconductor allomorphous. The solid light source allomorphous' light-emitting surface's polymer coating contains a fixed amount of inorganic light-emitting material. The initial radiation of the UV solid light source is converted to white light radiation. The color temperature is between T=2500K and 12000K.

The solid light source surface is covered with polymer and has the inorganic light-emitting material coating distributed in between. The light source is excited by the above-mentioned UV solid light source, and produced by the inorganic light-emitting material with chemical formula as described before, $Sr_2CaLn_2(SiO_4)_{3\pm\delta}$. The angle of light emission is 180°. The light flux is 6 Lumens. The power ratio is, under a full load, W=0.2 watts. The light source delivers not less than $\eta$=30 Lumen/watt.

As mentioned above, the novel UV solid light source's inorganic powder chemical structure is a rare invention. The industrial applications, innovation and advancement all meet the requirements for an invention patent. Thus, this application is submitted in accordance with the law.

The aforesaid preferred embodiments serve as examples, only. They are not intended for limiting the scope of this invention.

What is claimed is:

1. An inorganic light-emitting material for a UV solid light source, using a UV solid light source through external covered inorganic light-emitting material to excite and emit white light, wherein the chemical formula of the inorganic light-emitting material is $Sr_2CaLn_2(SiO_4)_{3\pm\delta}$ which contains light centers, wherein Ln is selected from the group consisting of Lu, Y, Gd, Sc, Yb, and Tb and wherein the light-emitting centers consist of $Eu^{+2}$, $Sm^{+2}$, $Yb^{+2}$, $Mn^{+2}$, $Sn^{+2}$, and $Cu^{+2}$ distributed inside the Sr and/or Ca lattice nodes and consist of $Ce^{+3}$, $Eu^{+3}$, $Tb^{+3}$, $Sm^{+3}$, and $Dy^{+3}$ distributed inside the Ln lattice nodes and $0 \leq \delta \leq 0.2$.

2. The inorganic light-emitting material for a UV solid light source as claimed in claim 1, wherein within said range of the chemical index $0 \leq \delta \leq 0.2$, under a light radiation wavelength $\lambda \leq 430$ nm, multiple zone radiations are formed with a color temperature ranging between about T=2500K and 12000K.

3. The inorganic light-emitting material for a UV solid light source as claimed in claim 1, wherein when the chemical formula of the inorganic light-emitting material is $Sr_{2-x}Eu_x^{+2}Ca_{1-y}Mn_y^{+2}La_{2-z}Ce_z^{+3}(SiO_4)_{3+\delta}$, where $0 \leq \delta \leq 0.2$, $x=0.001$-$0.2$, $y=0.001$-$0.04$, $z=0.001$-$0.2$, and when excited, a light in a white-green-yellow spectrum range is emitted.

4. The inorganic light-emitting material for a UV solid light source as claimed in claim 1, wherein when the chemical formula of the inorganic light-emitting material is $Sr_{2-x}Sm^{+2}_xCa_1La_{1-z}Gd_1Ce^{+3}_z(SiO_4)_{3-\delta}$, where $0 \leq \delta \leq 0.2$, $x=0.001$-$0.2$, $y=0.001$-$0.2$, $z=0.001$-$0.2$, and when excited, a light in a green-yellow spectrum range is emitted.

5. The inorganic light-emitting material for a UV light solid light source as claimed in claim 1, wherein when the chemical formula of the inorganic light-emitting material is $Sr_{2-x}Eu^{+2}_xCa_1La_{1-z}Ce^{+3}_zY_{1-p}Tb^{+3}_p(SiO_4)_{3+\delta}$, where $0 \leq \delta \leq 0.2$, $x=0.001$-$0.2$, $p=0.01$-$0.2$, $z=0.001$-$0.2$, and when excited by light with wavelength $\lambda \leq 430$ nm, multiple zone white-green-yellow light is emitted.

6. The inorganic light-emitting material for a UV solid light source as claimed in claim 1, wherein when the chemical formula of the inorganic light-emitting material is $Sr_{2-x}Eu^{+2}_xCa_{1-y}Sn_y^{+2}Y_{1-z}Gd_1Ce^{+3}_z(SiO_4)_{3\pm67}$, where $0 \leq \delta \leq 0.2$, $x=0.001$-$0.2$, $y=0.005$-$0.2$, $z=0.001$-$0.2$, and when excited by light with wavelength $\lambda \leq 430$ nm, multiple zone blue-red-yellow light is emitted.

7. The inorganic light-emitting material for a UV solid light source as claimed in claim 1, wherein when the chemical formula of the inorganic light-emitting material is $Sr_{2-x}Eu_x^{+2}Ca_{1-y}Mn_y^{+2}Gd_{2-z}Ce^{+3}_z(SiO_4)_{3\pm67}$, where $0 \leq \delta \leq 0.2$, $x=0.001$-$0.2$, $y=0.01$-$0.1$, $z=0.01$-$0.2$, and when excited by light with wavelength $\lambda \leq 430$ nm, multiple zone blue-green-orange light is emitted.

8. An inorganic light-emitting material for a UV solid light source, using a UV solid light source through external covered inorganic light-emitting material to excite and emit white light, wherein the characteristics of the inorganic light-emitting material are that corresponding cation and cathode ions sub-lattices, two emitting centers, the chemical formula is $Sr_{2-x}Eu_x^{+2}Ca_{1-y}Mn_y^{+2}Y_{1-z}Ce_zGd_{1-p}Pr_p(SiO_4)_3$, where $x=0.001$-$0.2$, $y=0.001$-$0.04$, $z=0.001$-$0.2$, $p=0.001$-$0.02$, and the visible light zone emits blue, green, yellow, and orange lights, and composed of multiple zone radiation.

* * * * *